(12) United States Patent
Sato et al.

(10) Patent No.: US 11,327,485 B2
(45) Date of Patent: May 10, 2022

(54) CONTROL DEVICE FOR VEHICLE, AND VEHICLE

(71) Applicant: TOYOTA JIDOSHA KABUSHIKI KAISHA, Toyota (JP)

(72) Inventors: Jun Sato, Susono (JP); Keiko Tosaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 16/379,997

(22) Filed: Apr. 10, 2019

(65) Prior Publication Data
US 2019/0324452 A1 Oct. 24, 2019

(30) Foreign Application Priority Data
Apr. 19, 2018 (JP) .............................. JP2018-080613

(51) Int. Cl.
*G05D 1/00* (2006.01)
*G05D 1/02* (2020.01)

(52) U.S. Cl.
CPC ......... *G05D 1/0061* (2013.01); *G05D 1/0236* (2013.01); *G05D 1/0246* (2013.01); *G05D 1/0257* (2013.01); *G05D 1/0278* (2013.01)

(58) Field of Classification Search
CPC .. G05D 1/0061; G05D 1/0236; G05D 1/0278; G05D 1/0246; G05D 1/0257
See application file for complete search history.

(56) References Cited

U.S. PATENT DOCUMENTS

2011/0254956 A1 10/2011 Ishikawa
2016/0280236 A1* 9/2016 Otsuka ................ B60W 50/082
(Continued)

FOREIGN PATENT DOCUMENTS

JP              10-329575 A      12/1998
JP              2011-227663 A    11/2011
WO     WO-2019046204 A1 *  3/2019  ............ B60W 50/14

OTHER PUBLICATIONS

Gordon, Timothy; Lidberg, Mathias; Automated Driving and Autonomous Functions on Road Vehicles, Mar. 7, 2015, Vehicle System Dynamics, all. (Year: 2015).*

*Primary Examiner* — James J Lee
*Assistant Examiner* — Tawri M Matsushige
(74) *Attorney, Agent, or Firm* — Sughrue Mion, PLLC

(57) ABSTRACT

A control device for a vehicle that has a sensor that acquires automated driving information required for automated driving and a display that provides a driver with information. The control device includes an electronic control unit including a processor configured to: perform automated driving for automatically performing operations for driving the vehicle based on the automated driving information; and make a driving intervention degree of the driver change during automated driving, including: judge a distance or a required time until an anticipated switching point where switching to manual driving is anticipated; judge a difficulty of take-over of a driver when switching to manual driving; set a demanded driving intervention degree of a driver during automated driving based on the distance or required time up to the anticipated switching point and the difficulty of take-over; and provide information relating to the demanded driving intervention degree to the driver.

4 Claims, 7 Drawing Sheets

(56) References Cited

U.S. PATENT DOCUMENTS

| | | | |
|---|---|---|---|
| 2017/0227959 A1* | 8/2017 | Lauffer | G05D 1/0061 |
| 2017/0267238 A1* | 9/2017 | Mimura | B60W 50/14 |
| 2018/0032072 A1* | 2/2018 | Hoye | B60W 40/08 |
| 2018/0173227 A1* | 6/2018 | Mukai | B60W 50/0097 |
| 2018/0292833 A1* | 10/2018 | You | G05D 1/0088 |

* cited by examiner

CONTROL DEVICE FOR VEHICLE, AND VEHICLE

CROSS-REFERENCE TO RELATED APPLICATION

This application claims priority based on Japanese Patent Application No. 2018-080613 filed with the Japan Patent Office on Apr. 19, 2018, the entire contents of which are incorporated into the present specification by reference.

FIELD

The present disclosure relates to a control device for a vehicle, and a vehicle.

BACKGROUND

Japanese Unexamined Patent Publication No. 2011-227663 discloses a conventional control device for a vehicle configured so that when a driver takes at least one hand off from a steering wheel, it calculates the degree of danger to the driving based on the position of the released hand and issues a warning corresponding to that degree of danger.

SUMMARY

However, the above-mentioned conventional control device for a vehicle was configured to issue a warning based on the current driver condition of the position of the released hand. It did not provide the driver with information including a suitable warning etc. considering also future switching to manual driving during automated driving. For this reason, the driver was liable to be end up being asked to switch from automated driving to manual driving when the driver was not prepared for manual driving.

The present disclosure was made focusing on such a problem and has as its object to keep a driver from being asked to switch from automated driving to manual driving when the driver is not prepared for manual driving.

To solve this problem, according to one aspect of the present disclosure, there is provided a control device for a vehicle. The vehicle comprises an automated driving information acquiring device configured to acquire automated driving information required for automated driving and an information provision device configured to provide a driver with information. The control device comprises an automated driving control part configured to perform automated driving for automatically performing operations for driving the vehicle based on the automated driving information and a driving intervention degree control part configured to make a degree of driving intervention of the driver change during automated driving. The driving intervention degree control part comprises an anticipated switching judging part configured to judge a distance or a required time until an anticipated switching point where switching to manual driving is anticipated, a take-over difficulty judging part configured to judge a difficulty of take-over of a driver when switching to manual driving, a demanded driving intervention degree setting part configured to set a demanded degree of driving intervention of a driver during automated driving based on a distance or required time up to the anticipated switching point and the difficulty of take-over, and an information providing part configured to provide information relating to the demanded degree of driving intervention to the driver.

To solve this problem, according to one aspect of the present disclosure, there is provided a vehicle comprising an automated driving information acquiring device configured to acquire automated driving information required for automated driving, an information provision device configured to provide a driver with information and the control device configured to perform automated driving for automatically performing operations for driving the vehicle based on the automated driving information and to make a driving intervention degree of the driver change during automated driving. The control device is further configured to judge a distance or a required time until an anticipated switching point where switching to manual driving is anticipated, judge a difficulty of take-over of a driver when switching to manual driving, set a demanded driving intervention degree of a driver during automated driving based on the distance or required time up to the anticipated switching point and the difficulty of take-over and provide information relating to the demanded driving intervention degree to the driver.

According to these aspect of the present disclosure, it is possible to keep the driver from being asked to switch from automated driving to manual driving when the driver is not prepared for manual driving.

DESCRIPTION OF EMBODIMENTS

Figure 1:
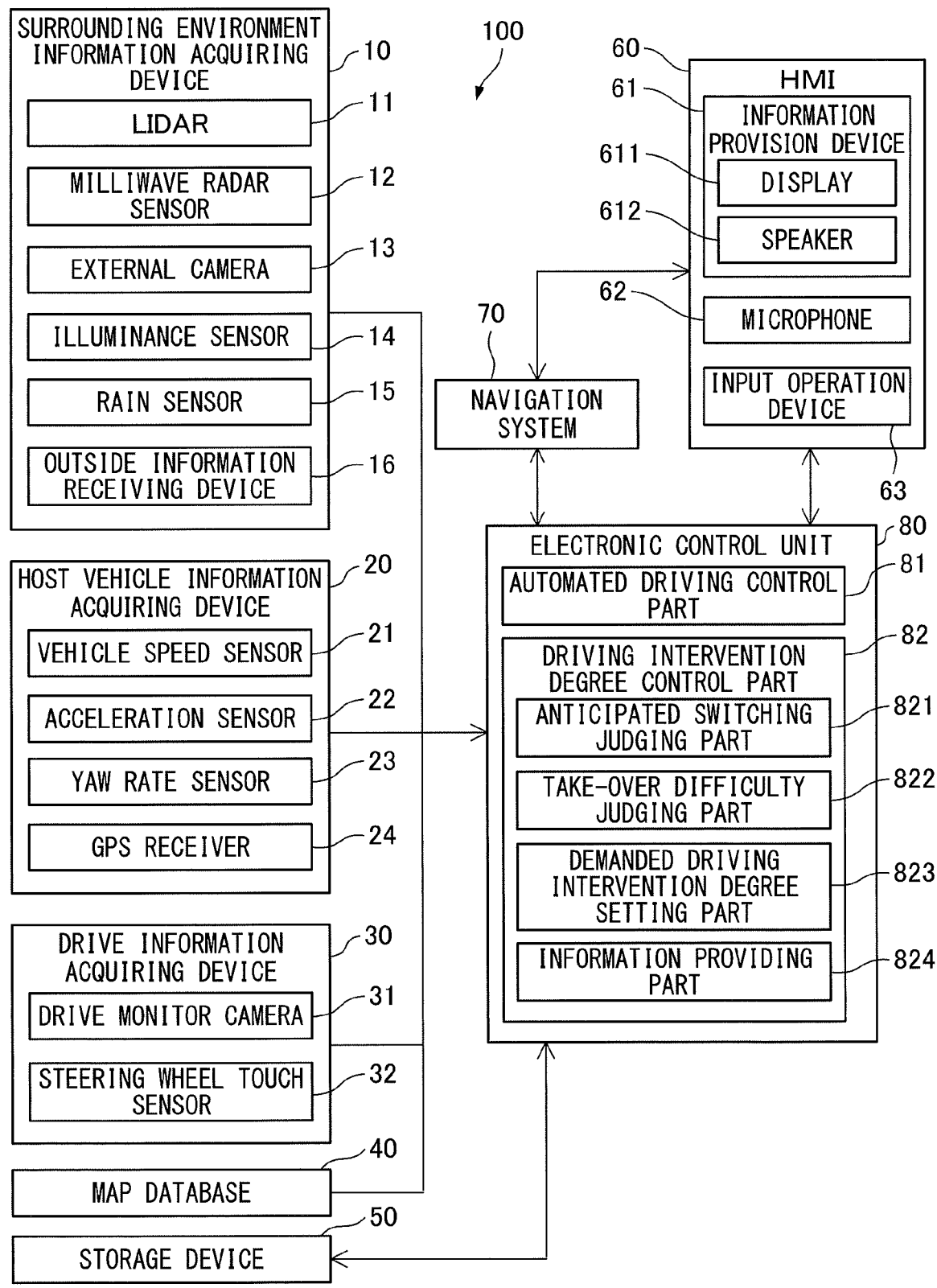
FIG. 1 is a schematic view of the configuration of an automated driving system for vehicular use according to a first embodiment of the present disclosure.

Below, embodiments of the present disclosure will be explained in detail with reference to the drawings. Note that in the following explanation, similar constituent elements are assigned the same reference numerals.

First Embodiment

Figure 2:
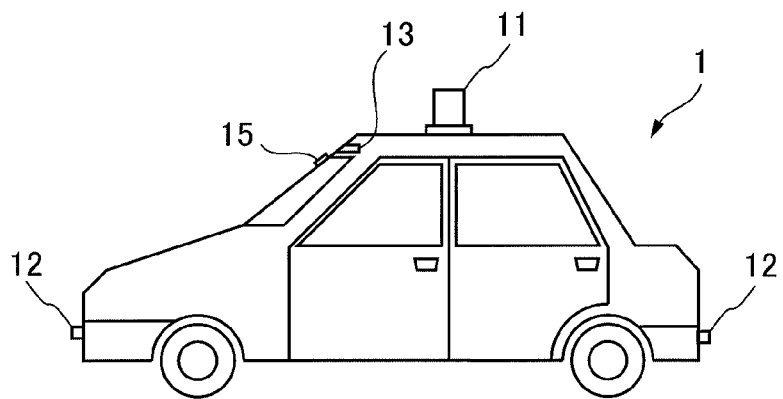
FIG. 2 is a schematic view of the appearance of the outside of a host vehicle mounting the automated driving system according to the first embodiment of the present disclosure.
Figure 3:
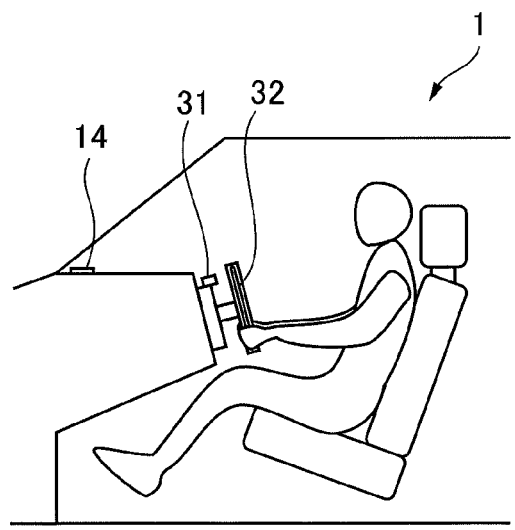
FIG. 3 is a schematic view of the appearance of an inside of the host vehicle mounting the automated driving system according to the first embodiment of the present disclosure.

FIG. 1 is a schematic view of the configuration of an automated driving system 100 for vehicular use according to a first embodiment of the present disclosure. FIG. 2 is a schematic view of the appearance of the outside of a host vehicle 1 mounting the automated driving system 100 according to the present embodiment. FIG. 3 is a schematic view of the appearance of an inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

Note that, the locations of attachment and number of the LIDAR devices 11 are not particularly limited so long as information required for generating the 3D images can be acquired. For example, they may also be dividedly attached to the grilles or to the insides of the headlights or brake lights and other such lights of the host vehicle 1 or may be attached divided to parts of the body (frame) of the host vehicle 1.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment and number of the milliwave radar sensors 12 are not particularly limited so long as the required information on the surroundings of the host vehicle can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the locations of attachment and number of the external cameras 13 are not particularly limited so long as the image of the area in front of the host vehicle 1 can be captured. For example, they may also be attached to the top of the center part of the back surface of the front glass of the host vehicle.

The illuminance sensor 14 detects the illuminance in the host vehicle surroundings. As shown in FIG. 2, in the present embodiment, the illuminance sensor 14 is, for example, attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring device 30 is a device for acquiring information relating to the condition of the driver of the host vehicle 1 (below, referred to as the "driver information"). As shown in FIG. 1 and FIG. 3, the driver information acquiring device 30 according to the present embodiment is provided with a driver monitor camera 31 and a steering wheel touch sensor 32.

The driver monitor camera 31 is attached to the top surface of the steering wheel column cover and captures an image of the appearance of the driver. The driver monitor camera 31 processes the captured image of the driver to detect information on the driver (direction of face of driver, degree of opening of eyes, etc.) and information on the appearance of the driver such as his posture. Further, the driver monitor camera 31 sends the detected information of the appearance of the driver to the electronic control unit 80.

The steering wheel touch sensor 32 is attached to the steering wheel. The steering wheel touch sensor 32 detects whether the driver is gripping the steering wheel and sends the detected information on the gripping of the steering wheel to the electronic control unit 80.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a passenger with the automated driving system 100. The HMI 60 according to the present embodiment is provided with an information provision device 61 for providing various types of information to the driver, a microphone 62 for picking up the voice of the driver, and a touch panel, operating buttons, or other input operation devices 63 for the driver to operate to input information etc.

The information provision device 61 is provided with a display 611 for displaying text information or image information and a speaker 612 for generating sound.

The navigation system 70 is an apparatus for guiding the host vehicle 1 to a destination set by the driver through the HMI 60. The navigation system 70 uses the current position information of the host vehicle 1 detected by the GPS receiver 24 and map information of the map database 40 as the basis to calculate the target route to the destination and transmits the information of the calculated target route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 81 automatically performing driving operations relating to acceleration, steering, and braking when the driver switches from the manual driving mode (mode where driver performs driving operations relating to acceleration, steering, and braking) to the automated driving mode. The automated driving control part 81 controls the various control parts required for performing driving operations relating to acceleration, steering, and braking and performs automated driving of the vehicle based on automated driving information required for automated driving input to the electronic control unit 80 such as information on the surrounding environment, information on the host vehicle, information on the driver, and navigation information.

Here, the driver obtains a grasp of the surrounding traffic environment of the host vehicle during manual driving and performs suitable driving operations corresponding to the surrounding traffic environment. On the other hand, during automated driving, sometimes the driver does not intervene with the driving or sometimes even if he or she has intervened in the driving, the degree of driving intervention (driving intervention degree) is low.

For this reason, when switching to manual driving during automated driving is demanded, if the driver has not intervened in driving or has intervened in driving but the driving intervention degree is low, sometimes it is not possible for the driver to immediately obtain a grasp of the surrounding traffic environment. As a result, when switching to manual driving, suitable driving operations are liable to be unable to be performed, for example, the behavior of the vehicle is liable to be disturbed. That is, when the driving intervention degree is low during automated driving, it can be said that the driver is not prepared for manual driving.

Therefore, if there is a point where switching to manual driving is anticipated on a target route of the host vehicle 1 during automated driving (below, referred to as an "anticipated switching point"), it is preferable to make the driving intervention degree of the driver change based on the distance or required time up to the anticipated switching point. Specifically, it is preferably to gradually raise the driving intervention degree of the driver the closer to the anticipated switching point.

By doing this, it is possible to keep the driver from being asked to switch from automated driving to manual driving when the driver is not prepared for manual driving. That is, when being asked to switch to manual driving, it is possible to keep the driver from having to rapidly change his own condition from a state not prepared for manual driving to a state having to perform manual driving. For this reason, when being asked to switch to manual driving, it is possible to make a smooth transition from automated driving to manual driving without making the driver condition rapidly change.

Note that as an anticipated switching point, for example, an end point of a section where automated driving is possible (below, referred to as an "automated driving section") may be mentioned. Further, aside from this as well, for example, when there is a section on a target route where the accuracy of detection of the surrounding environment information will fall due to heavy rain or heavy snow, dense fog, strong wind, or other weather conditions or a road environment such as the exit of a tunnel and continuation of automated driving is considered difficult, the point of entry into that section may be mentioned. In this way, an anticipated switching point is a point of limit of automated driving able to be anticipated by some sort of means.

Further, sometimes, during automated driving, for example, the LIDAR device 11 or various sensors or cameras malfunction and the surrounding environment information or host vehicle information or driver information can no longer be normally detected or otherwise some sort of unexpected reason causes continuation of automated driving to become unsuitable. When becoming such a situation, switching to manual driving is preferable.

For this reason, even before reaching the anticipated switching point, sometimes a need arises for switching to manual driving. In such a case as well, it is preferable to make a smooth transition from automated driving to manual driving without making the driver condition rapidly change, but it is difficult to predict the occurrence of such an above-mentioned unpredictable situation, so it difficult to predict the occurrence of a demand for switching to manual driving before reaching an anticipated switching point.

Here, the surrounding traffic environment of the host vehicle changes with each instant. The difficulty of take-over of the driver when switching to manual driving changes according to the surrounding traffic environment.

For example, when traffic is heavy or when the relative distance from another vehicle is close or when the relative speed is fast, when the road being driven on is high in speed limit or the curvature is small, when traffic restrictions are in place, or otherwise the surrounding traffic environment is complicated, it takes time to obtain a grasp of the surrounding traffic environment and the driving operations when switching to manual driving also tend to become complicated. For this reason, when the surrounding traffic environment is complicated, the load on the driver when switching to manual driving inevitably becomes larger, so the difficulty of take-over of the driver becomes greater. On the other hand, if the surrounding traffic environment is simple, the load of the driver when switching to manual driving also becomes smaller, so the difficulty of take-over of the driver becomes lower.

For this reason, for example, if the driver condition is a certain driver condition, when switching to manual driving is demanded in a situation where the surrounding traffic environment is complicated, compared to when it is demanded in a situation where the surrounding traffic environment is simple, it can be said that the change in driver condition also becomes larger by exactly the amount of the increase in the load of the driver when switching to manual driving.

Therefore, it is desirable to make the driving intervention degree of the driver change based on the surrounding traffic environment of the host vehicle and in turn the difficulty of take-over of the driver when switching to manual driving. Specifically, when the difficulty of take-over of the driver when switching to manual driving is high, compared to when it is low, it is preferable to make the driving intervention degree of the driver higher. By doing this, even if switching to manual driving is demanded before reaching the anticipated switching point, it is possible to keep the driver condition from rapidly changing. For this reason, it is possible to make a smooth transition from automated driving to manual driving.

Therefore, the electronic control unit 80 according to the present embodiment is provided with not only the automated driving control part 81, but also a driving intervention degree control part 82 for making the driving intervention degree of the driver change during automated driving. Further, the driving intervention degree control part 82 is provided with an anticipated switching judging part 821, take-over difficulty judging part 822, demanded driving intervention degree setting part 823, and information providing part 824 and is configured to enable a suitable driving intervention degree of the driver demanded during automated driving (below, referred to as the "demanded driving intervention degree") to be set based on the distance (or the required time) to the anticipated switching point and difficulty of take-over of the driver when switching to manual driving.

Figure 4:
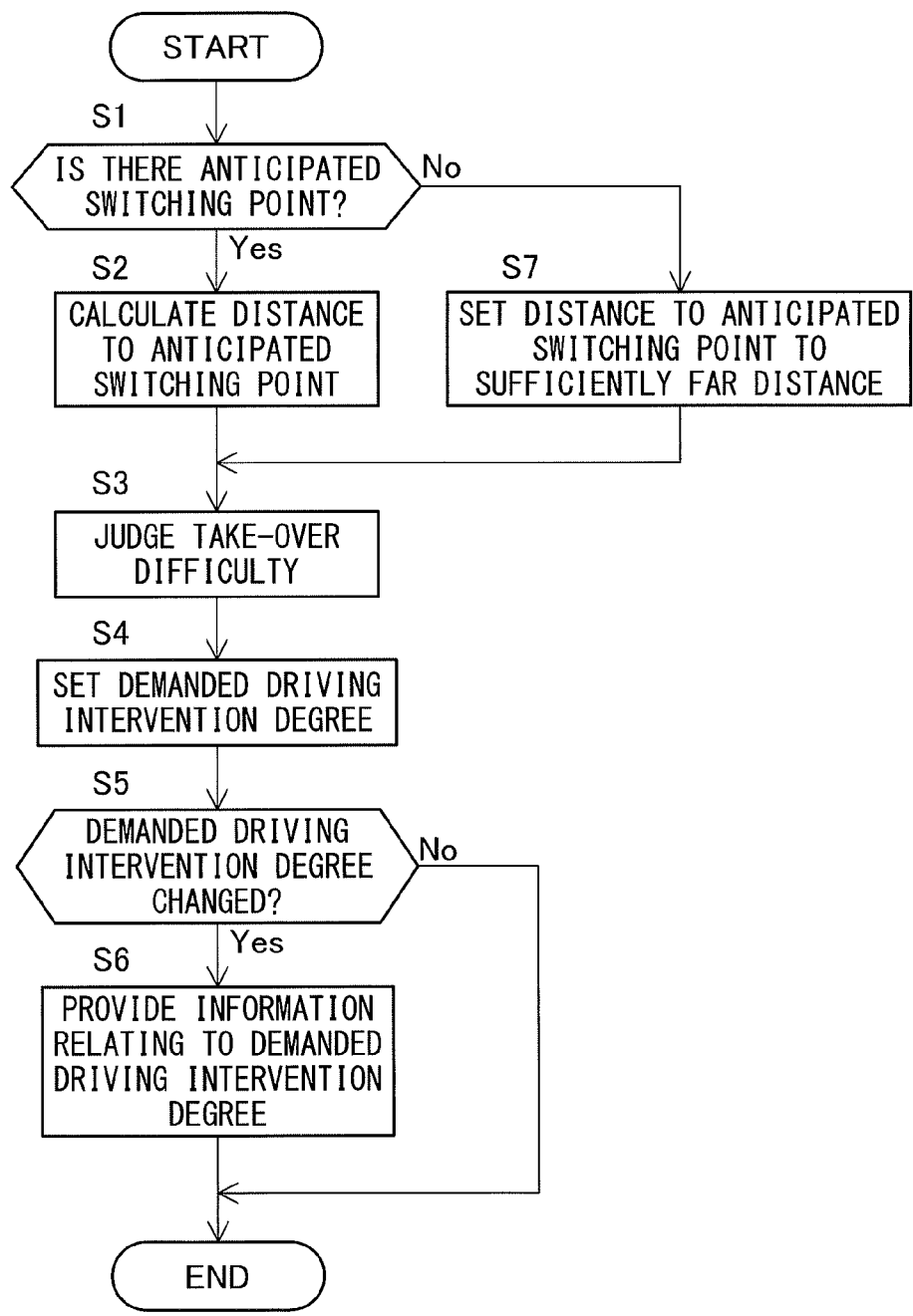
FIG. 4 is a flow chart for explaining control of a degree of driving intervention according to the first embodiment of the present disclosure.

FIG. 4 is a flow chart for explaining control of a driving intervention degree according to the present embodiment performed by the electronic control unit 80. The electronic control unit 80 repeatedly performs the present routine by a predetermined processing period during the automated driving mode.

At step S1, the electronic control unit 80 judges if there is an anticipated switching point on the target route of the host vehicle 1. In the present embodiment, the electronic control unit 80 judges if there is an end point of an automated driving section on a target route based on navigation information and, if there is that end point, judges that there is an anticipated switching point. Further, the electronic control unit 80 judges if there is a section where continuation of automated driving on the target route would be difficult due to for example weather conditions or the road environment etc. based on the navigation information and external information included in the surrounding environment information according to need and if there is such a section, judges that there is an anticipated switching point. Note that, the specific method for judging if there is an anticipated switching point on the target route is not limited to such a method.

The electronic control unit 80 proceeds to the processing of step S2 if there is an anticipated switching point on the target route. On the other hand, the electronic control unit 80 proceeds to the processing of step S7 if there is no anticipated switching point on the target route.

At step S2, the electronic control unit 80 calculates the distance or required time up to the anticipated switching point. In the present embodiment, the electronic control unit 80 calculates the distance to the anticipated switching point based on the current position of the host vehicle contained in the host vehicle information and the anticipated switching point.

At step S3, the electronic control unit 80 judges the difficulty of take-over of the driver in the case of switching to manual driving at the current point of time. In the present embodiment, the electronic control unit 80 recognizes the surrounding traffic environment and judges the difficulty of take-over of the driver based on the surrounding environment information. Note that, in the present embodiment, it divides the difficulty of take-over of the driver into three stages (easy, intermediate, and difficult) in accordance with the complexity of the surrounding traffic environment (above-mentioned level of traffic, curvature of road, etc.).

Figure 5:
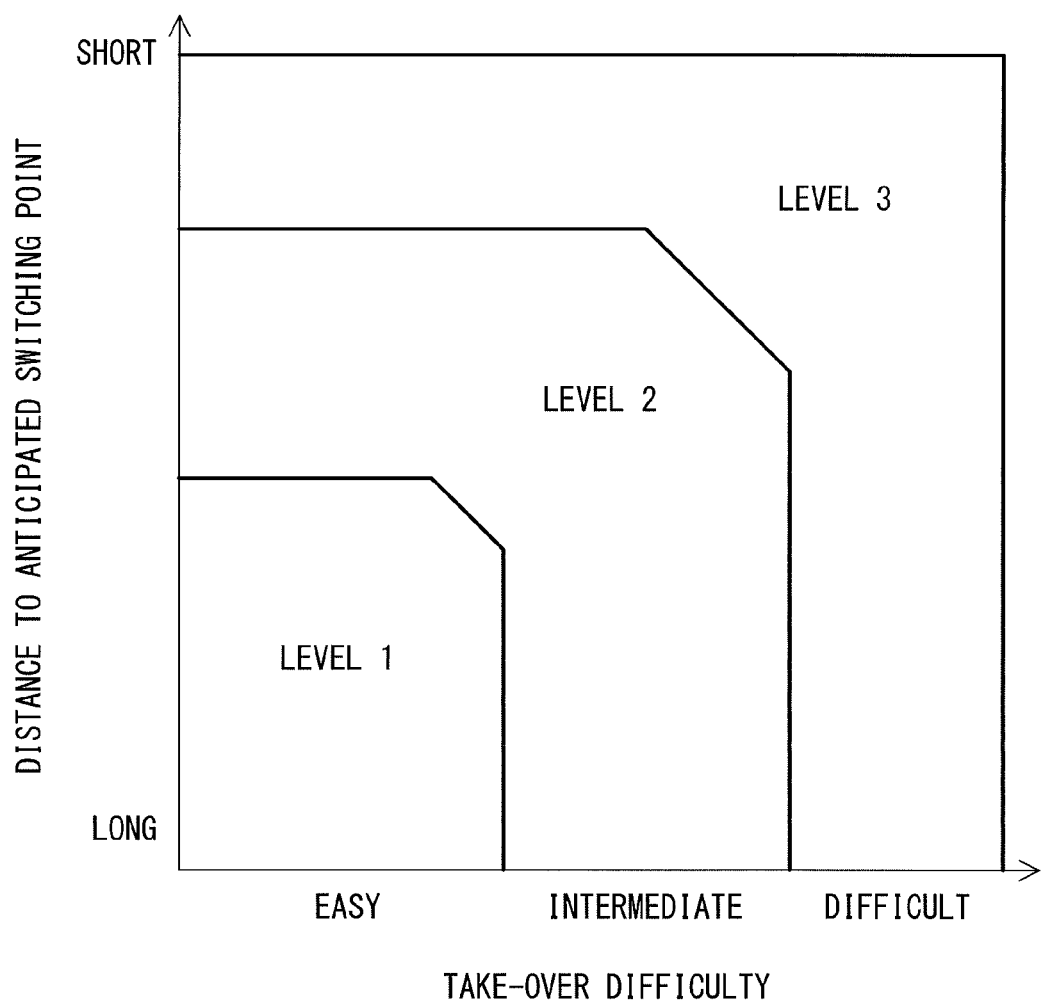
FIG. 5 is one example of a map for setting a demanded degree of driving intervention based on a distance to an anticipated switching point and a difficulty of take-over of a driver.

At step S4, the electronic control unit 80 refers to the map of FIG. 5 and sets the demanded driving intervention degree for the driver during automated driving based on the distance to the anticipated switching point and difficulty of take-over of the driver.

As shown in FIG. 5, in the present embodiment, the demanded driving intervention degree is roughly classified into a level 1, level 2, and level 3.

The demanded driving intervention degree is the level 1 when the automated driving system 100 judges that driving intervention by the driver is not necessary. For example, this is when performing sub tasks not related with driving operation (operation of smartphone etc.) is allowed.

The demanded driving intervention degree is the level 2 when the automated driving system 100 is demanding intermittent driving intervention by the driver. For example, this is when the automated driving system 100 asks the driver for permission to perform various types of driver assistance (changing lanes or changing speeds etc.) and performs the driver assistance only when the driver has obtained a grasp of the surrounding traffic environment and permitted that driver assistance.

The demanded driving intervention degree is the level 3 when the automated driving system 100 demands continuous driving intervention from the driver. For example, this is when performing driver assistance only when the driver instructs the automated driving system 100 to perform various types of driver assistance.

As shown in FIG. 5, the demanded driving intervention degree is made higher when the distance (or the required time) to the anticipated switching point is short compared to when it is long. Further, the demanded driving intervention degree is made higher when the difficulty of take-over of the driver is high compared to when it is low.

At step S5, the electronic control unit 80 judges if the demanded driving intervention degree has been changed. Specifically, the electronic control unit 80 judges if the demanded driving intervention degree set by the previous processing and the demanded driving intervention degree set by the current processing differ and if they differ judges that the demanded driving intervention degree has been changed. The electronic control unit 80 proceeds to the processing of step S6 if the demanded driving intervention degree has been changed. On the other hand, the electronic control unit 80 ends the current processing if the demanded driving intervention degree has not been changed.

At step S6, the electronic control unit 80 provides information relating to the demanded driving intervention degree through the information provision device 61 to the driver. The information relating to the demanded driving intervention degree is for example information enabling a driver to be prompted to change his condition toward a condition corresponding to the demanded driving intervention degree. It is possible to provide specific information by text or voice or possible to provide simple information by changing the level of sound of a buzzer etc. By providing information relating to the demanded driving intervention degree to the driver in this way, it is possible to prompt the driver to change the condition of the driver so that the driving intervention degree of the driver becomes the demanded driving intervention degree.

At step S7, the electronic control unit 80 sets the distance to the anticipated switching point to a distance where the demanded driving intervention degree would be set to the level 1 if not considering the difficulty of take-over of the driver, that is, a certain constant distance sufficiently separated from the anticipated switching point. Therefore, when proceeding through step S7 to the processing of step S3 and on, the demanded driving intervention degree is set based on the difficulty of take-over of the driver.

Figure 6:
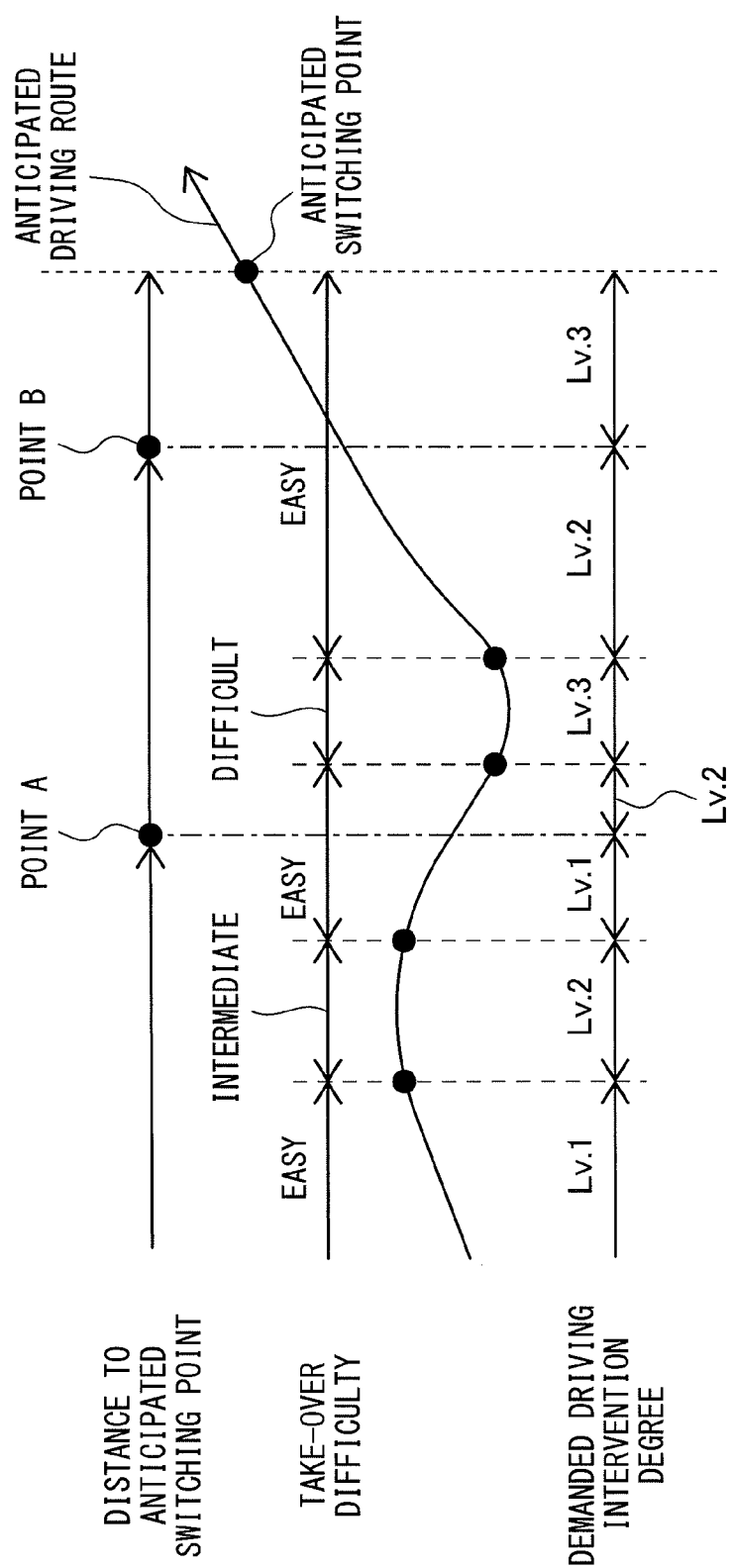
FIG. 6 is a view showing one example of a demanded degree of driving intervention set by the control of a degree of driving intervention according to the first embodiment of the present disclosure.

FIG. 6 is a view showing one example of the demanded driving intervention degree set by control of the driving intervention degree according to the present embodiment. Note that FIG. 6 shows an example of judging the difficulty of take-over of the driver by the curvature of the road. A section with a take-over difficulty described as "easy" in FIG. 6 is a section where the road is straight or is deemed straight. Further, a section with a take-over difficulty described as "intermediate" is a section where the road is gently curved (curve with large curvature), while a section described as "difficult" is a section where the road is sharply curved (curve with small curvature).

As shown in FIG. 6, until reaching the point A a constant distance or more separated from the anticipated switching point, basically the demanded driving intervention degree changes according to the difficulty of take-over of the driver.

Therefore, in the example shown in FIG. 6, there is a section where the difficulty of take-over of the driver becomes "intermediate" in the sections up to reaching the point A, so the demanded driving intervention degree of that section is set to the level 2 and the demanded driving intervention degree of the sections other than that section is set to the level 1.

Further, in the section from the point A close to the anticipated switching point by a constant amount or more to the point B, it is necessary to gradually raise the driving intervention degree of the driver toward the anticipated switching point, so the demanded driving intervention degree is basically set to the level 2 or more. Further, when it is necessary to raise the demanded driving intervention degree from the level 2 when considering the difficulty of take-over of the driver, the demanded driving intervention degree is made higher in accordance with the difficulty of take-over of the driver.

Therefore, in the example shown in FIG. 6, the demanded driving intervention degree of a section where the difficulty of take-over of the driver is "difficult" in the sections from the point A to the point B is set to the level 3 while the demanded driving intervention degrees of the sections other than that section are set to the level 2.

Further, after reaching the point B, switching to manual driving is anticipated in a certain time period, so the driving intervention degree of the driver has to be further raised. For this reason, after reaching the point B, the demanded driving intervention degree is set to the level 3.

According to the present embodiment explained above, there is provided an electronic control unit 80 (control device) for controlling a vehicle provided with an automated driving information acquiring device configured to acquire automated driving information required for automated driving, for example, surrounding environment information or host vehicle information, driver information, and navigation information (surrounding environment information acquiring device 10, host vehicle information acquiring device 20, driver information acquiring device 30, navigation system 70) and an information provision device 61 configured to provide information to the driver. The control device is provided with an automated driving control part 81 configured to perform automated driving for automatically performing driving operations of the vehicle based on the automated driving information and a driving intervention degree control part 82 making a driving intervention degree of the driver change during automated driving.

Further, the driving intervention degree control part 82 is configured provided with an anticipated switching judging part 821 configured to judge a distance or required time up to the anticipated switching point where switching to manual driving is anticipated, a take-over difficulty judging part 822 configured to judge a difficulty of take-over of a driver when switching to manual driving, a demanded driving intervention degree setting part 823 configured to set a demanded driving intervention degree of a driver during automated driving based on the distance or required time up to the anticipated switching point and take-over difficulty, and an information providing part 824 configured to provide information relating to the demanded driving intervention degree to the driver. Specifically, the demanded driving intervention degree setting part 823 is configured to raise the demanded driving intervention degree when the distance or required time up to the anticipated switching point is short compared to when it is long and to raise the demanded driving intervention degree when the difficulty of take-over is high compared to when it is low.

Due to this, it is possible to transmit to the driver a suitable driving intervention degree during automated driving, so it is possible to keep the driver from being asked to switch from automated driving to manual driving when not prepared for manual driving.

Further, when setting the demanded driving intervention degree based only on the difficulty of take-over of the driver when switching to manual driving, even if there is an anticipated switching point at a position near from the current location, it is presumed that the demanded driving intervention degree will end up being lowered. This being so, despite there being a need to switch to manual driving in the near future, the demanded driving intervention degree ends up being lowered. The driver is liable to be asked to switch to manual driving from automated driving when in a state not prepared for manual driving.

As opposed to this, when, like in the present embodiment, setting the demanded driving intervention degree while considering the distance or required time up to the anticipated switching point, if there is an anticipated switching point at a position near from the current location, it is possible to maintain the demanded driving intervention degree in a high state. For this reason, if switching to manual driving is anticipated in the near future, it is possible to keep the demanded driving intervention degree from unintentionally ending up being lowered.

Second Embodiment

Next, a second embodiment of the present disclosure will be explained. The present embodiment differs from the first embodiment on the point of judging the current driving intervention degree of the driver (below, referred to as the "actual driving intervention degree") and, when the actual driving intervention degree and the demanded driving intervention degree diverge, providing information according to the degree of divergence to the driver. Below, this point of difference will be focused on in the explanation.

Figure 7:
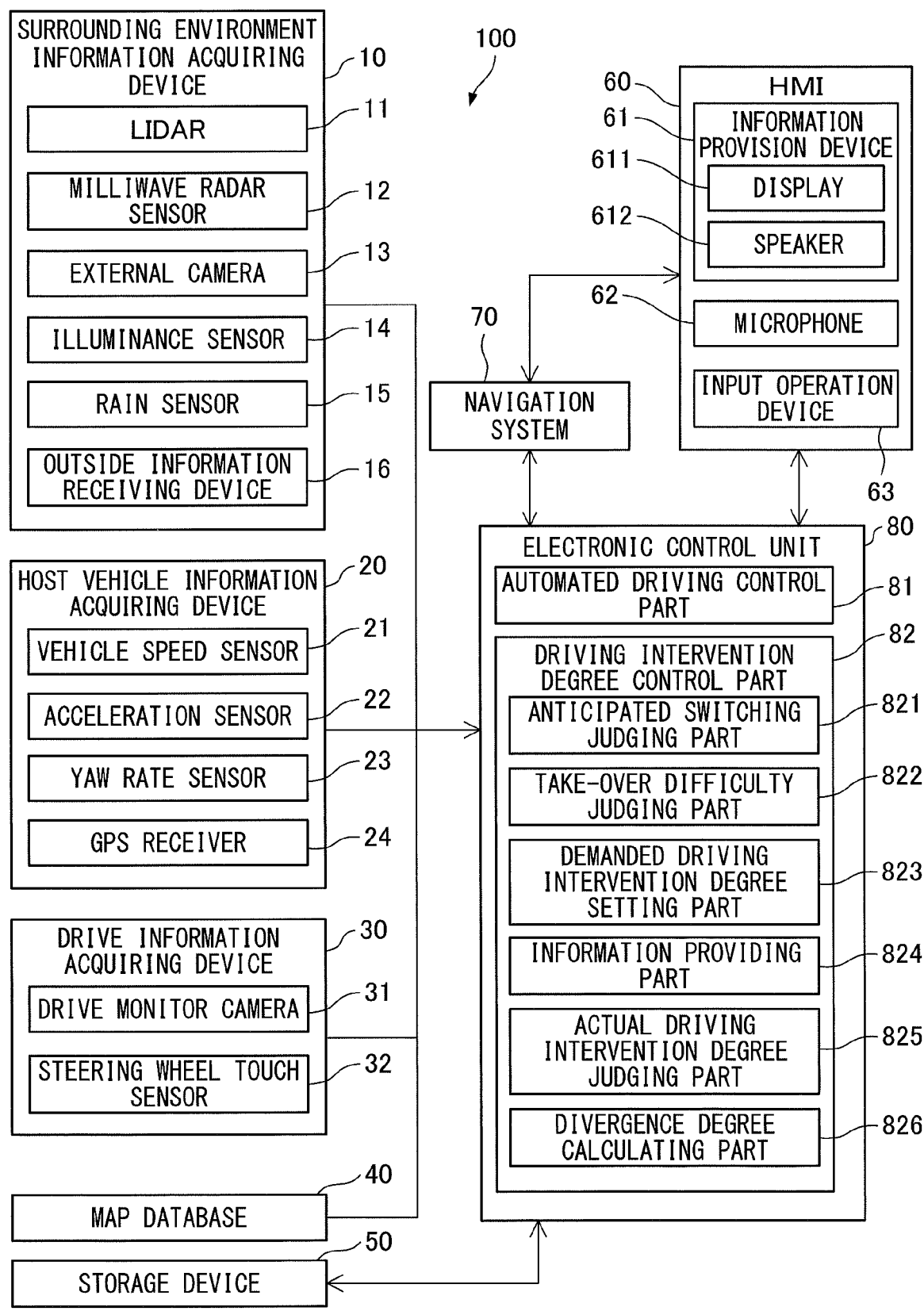
FIG. 7 is a schematic view of the configuration of an automated driving system for vehicular use according to a second embodiment of the present disclosure.

FIG. 7 is a schematic view of the constitution of an automated driving system 100 for vehicular use according to the second embodiment of the present disclosure.

As shown in FIG. 7, the driving intervention degree control part 82 according to the present embodiment is provided with the anticipated switching judging part 821, take-over difficulty judging part 822, demanded driving intervention degree setting part 823, and information providing part 824 plus an actual driving intervention degree judging part 825 and a divergence degree calculating part 826. If the actual driving intervention degree and the demanded driving intervention degree diverge, the part is configured to provide information corresponding to the degree of divergence to the driver.

Figure 8:
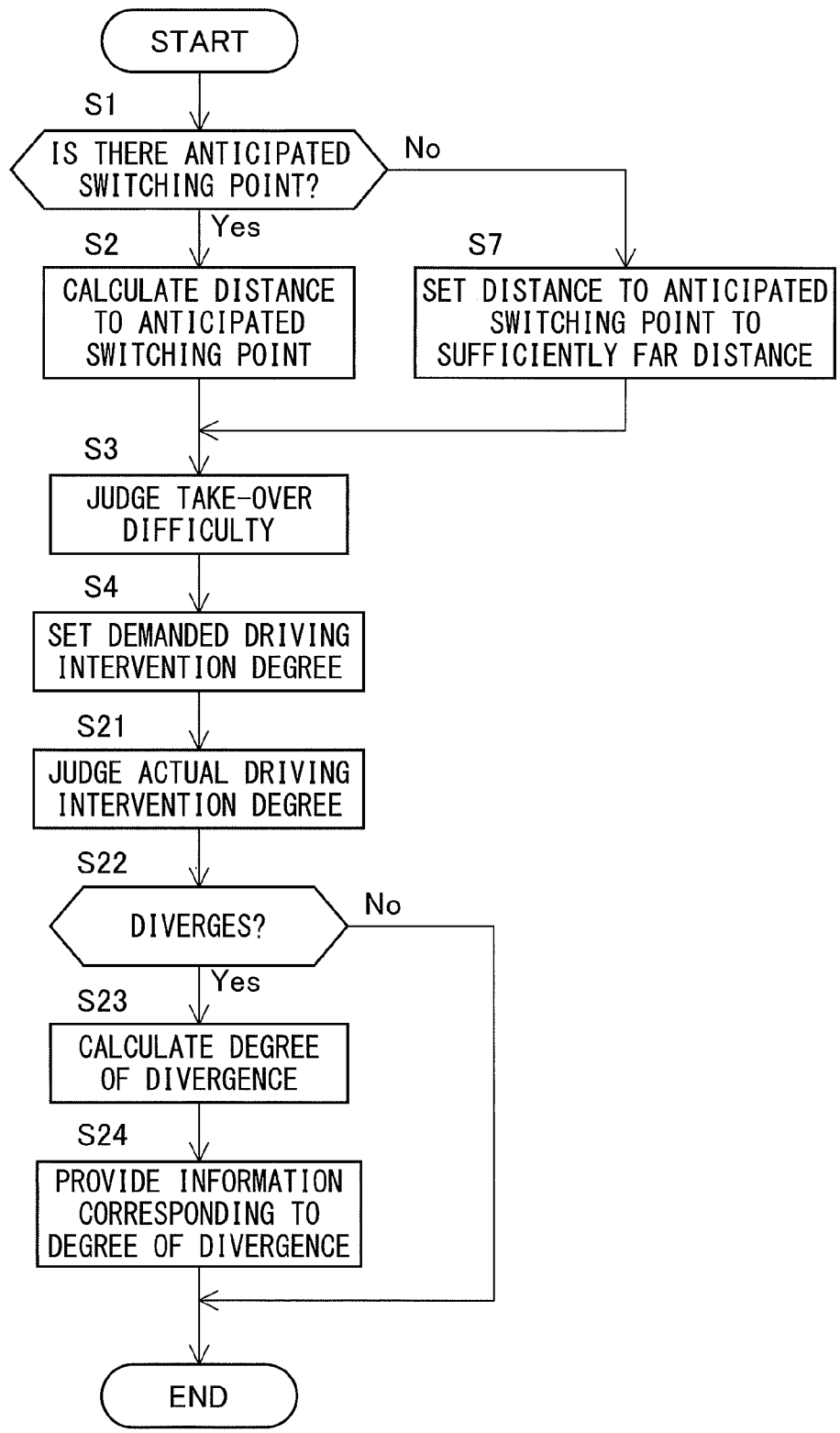
FIG. 8 is a flow chart for explaining control of a degree of driving intervention according to the second embodiment of the present disclosure.

FIG. 8 is a flow chart for explaining the driving intervention degree control according to the present embodiment. The electronic control unit 80 repeatedly performs the present routine by a predetermined processing period during the automated driving mode. Note that in FIG. 7, the processing from step S1 to step S4 and the processing of step S7 are processing similar to the first embodiment explained above, so here the explanation will be omitted.

At step S21, the electronic control unit 80 judges the actual driving intervention degree of the driver based on for example information on the appearance of the driver contained in the driver information.

At step S22, the electronic control unit 80 judges if the actual driving intervention degree and the demanded driving intervention degree diverge. The electronic control unit 80 proceeds to the processing of step S23 if the actual driving intervention degree and the demanded driving intervention degree diverge. On the other hand, the electronic control unit 80 ends the current processing if the actual driving intervention degree and the demanded driving intervention degree do not diverge.

At step S23, the electronic control unit 80 calculates the degree of divergence of the actual driving intervention degree and the demanded driving intervention degree.

At step S24, the electronic control unit 80 provides the driver with information corresponding to the degree of divergence. For example, when the demanded driving intervention degree is higher than the actual driving intervention degree, the electronic control unit 80 provides information to the driver able to prompt raising the actual driving intervention degree to the demanded driving intervention degree in accordance with the degree of divergence. On the other hand, when the demanded driving intervention degree is lower than the actual driving intervention degree, it provides information to the driver to the effect that the driving intervention degree may be lowered in accordance with the degree of divergence.

The driving intervention degree control part 82 of the electronic control unit 80 according to the present embodiment explained above is provided with the anticipated switching judging part 821 explained in the first embodiment, the difficulty of take-over judging part 822, the demanded driving intervention degree judging part, and the information providing part 824 plus an actual driving intervention degree judging part 825 configured to judge an actual driving intervention degree of the driver and a divergence degree calculating part 826 configured to calculate a degree of divergence between the actual driving intervention degree and the demanded driving intervention degree.

Further, the information providing part 824 is configured to provide the driver with information corresponding to the degree of divergence as information relating to the demanded driving intervention degree.

Due to this, effects similar to the first embodiment can be obtained. In addition, information for making the driver condition change toward a condition corresponding to the demanded driving intervention degree can be suitably changed based on the degree of divergence. For this reason, it is possible to make the driver condition change toward a condition corresponding to the demanded driving intervention degree more reliably.

Above, embodiments of the present disclosure were explained, but the above embodiments only show some of the examples of application of the present disclosure and are not meant to limit the technical scope of the present disclosure to the specific constitutions of the above embodiments.

The invention claimed is:

1. A control device for a vehicle,
wherein the vehicle comprises:
  at least one sensor configured to acquire automated driving information required for automated driving; and
  a display configured to provide a driver with information,
the control device comprising:
an electronic control unit including a processor configured to:
  perform automated driving for automatically performing operations for driving the vehicle based on the automated driving information;
  judge a distance or a required time until an anticipated switching point where switching to manual driving is anticipated;
  judge a difficulty of take-over of a driver for switching to manual driving at the anticipated switching point;
  set a demanded driving intervention degree of a driver during automated driving based on (i) the distance or required time up to the anticipated switching point and (ii) the difficulty of take-over;
  provide information relating to the demanded driving intervention degree to the drive;
  judge an actual driving intervention degree of the driver;
  determine whether the actual driving intervention degree and the demanded driving intervention degree diverge;
  based upon the determination that the actual driving intervention degree and the demanded driving intervention degree diverge, calculate a degree of the divergence between the actual driving intervention degree and the demanded driving intervention degree; and
  provide information corresponding to the degree of divergence to the driver as information relating to the demanded driving intervention degree, so as to prompt the driver to change a condition of the driver so that the actual driving intervention degree becomes the demanded driving intervention degree.

2. The control device for the vehicle according to claim 1, wherein
  the electronic control unit is further configured to raise the demanded driving intervention degree if the distance or required time up to the anticipated switching point is short compared to when it is long.

3. The control device for the vehicle according to claim 1, wherein
  the electronic control unit is further configured to raise the demanded driving intervention degree if a take-over difficulty is high compared to when it is low.

4. A vehicle comprising:
  at least one sensor configured to acquire automated driving information required for automated driving;
  a display configured to provide a driver with information; and
  an electronic control unit including a processor configured to:
  perform automated driving for automatically performing operations for driving the vehicle based on the automated driving information;
  judge a distance or a required time until an anticipated switching point where switching to manual driving is anticipated;
  judge a difficulty of take-over of a driver for switching to manual driving at the anticipated switching point;
  set a demanded driving intervention degree of a driver during automated driving based on (i) the distance or required time up to the anticipated switching point and (ii) the difficulty of take-over;
  provide information relating to the demanded driving intervention degree to the drive;
  judge an actual driving intervention degree of the driver;
  determine whether the actual driving intervention degree and the demanded driving intervention degree diverge;
  based upon the determination that the actual driving intervention degree and the demanded driving intervention degree diverge, calculate a degree of the divergence between the actual driving intervention degree and the demanded driving intervention degree; and
  provide information corresponding to the degree of the divergence to the driver as information relating to the demanded driving intervention degree, so as to prompt the driver to change a condition of the driver so that the actual driving intervention degree becomes the demanded driving intervention degree.

* * * * *